(12) United States Patent
Ogino

(10) Patent No.: US 9,817,304 B2
(45) Date of Patent: Nov. 14, 2017

(54) LIGHT SOURCE UNIT HAVING OPTICAL DEVICE HAVING DIFFUSING LAYER AND DICHROIC LAYER, PROJECTOR, OPTICAL DEVICE, AND OPTICAL DEVICE MANUFACTURING METHOD

(71) Applicant: CASIO COMPUTER CO., LTD., Shibuya-ku, Tokyo (JP)

(72) Inventor: Hiroshi Ogino, Higashimurayama (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 402 days.

(21) Appl. No.: 14/659,492

(22) Filed: Mar. 16, 2015

(65) Prior Publication Data

US 2015/0261077 A1 Sep. 17, 2015

(30) Foreign Application Priority Data

Mar. 17, 2014 (JP) ................................. 2014-053377

(51) Int. Cl.
*G03B 21/14* (2006.01)
*H04N 9/31* (2006.01)
*G03B 21/20* (2006.01)
*G02B 27/14* (2006.01)
*G02B 27/10* (2006.01)
*G03B 21/00* (2006.01)
*G03B 33/12* (2006.01)

(52) U.S. Cl.
CPC ....... *G03B 21/204* (2013.01); *G02B 27/1073* (2013.01); *G02B 27/141* (2013.01); *G03B 21/005* (2013.01); *G03B 33/12* (2013.01); *H04N 9/3102* (2013.01)

(58) Field of Classification Search
CPC ............ G02B 27/1006; G02B 27/1033; G02B 27/141; G02B 27/10; G03B 21/005; G03B 21/006; G03B 21/008; G03B 21/204; G03B 21/14; H04N 9/31; H04N 9/3102; H04N 9/3114; H04N 9/3197
USPC ........ 348/742, 743, 771; 359/583, 589, 590, 359/629, 634, 5, 7, 8, 9; 353/31, 34, 37
See application file for complete search history.

(56) References Cited

U.S. PATENT DOCUMENTS 7,535,636 B2 * 5/2009 Lippey ................... G03B 21/60
359/443
2001/0001459 A1 * 5/2001 Savant ................. G02B 5/0221
216/24

(Continued)

FOREIGN PATENT DOCUMENTS

JP 2011154168 A 8/2011

*Primary Examiner* — William C Dowling
(74) *Attorney, Agent, or Firm* — Holtz, Holtz & Volek PC

(57) ABSTRACT

There is provided a light source unit comprising a first light source having a solid light emitting device, a second light source having a luminescent material layer which emits light in a wavelength range which is different from light in a wavelength range which is emitted from the first light source by using the light emitted from the first light source as an excitation light source, and an optical device which is disposed between the first light source and the second light source, wherein the optical device has a dichroic layer which transmits a pencil of light emitted by the first light source and reflects a pencil of light emitted by the second light source, and a diffusing layer which diffuses the pencil of light emitted from the first light source.

14 Claims, 9 Drawing Sheets

(56) References Cited

U.S. PATENT DOCUMENTS

| | | | |
|---|---|---|---|
| 2005/0018106 A1* | 1/2005 | Wang | G02F 1/133502 349/96 |
| 2008/0285125 A1* | 11/2008 | Lee | G02B 6/08 359/449 |
| 2013/0242267 A1* | 9/2013 | Ogura | F21S 2/00 353/31 |

* cited by examiner

LIGHT SOURCE UNIT HAVING OPTICAL DEVICE HAVING DIFFUSING LAYER AND DICHROIC LAYER, PROJECTOR, OPTICAL DEVICE, AND OPTICAL DEVICE MANUFACTURING METHOD

CROSS-REFERENCE TO RELATED APPLICATION

This patent application is based upon and claims the benefit of priority under 35 USC 119 from the prior Japanese Patent Application No. 2014-53377 filed on Mar. 17, 2014, the entire disclosure of which, including the description, claims, drawings and abstract, is incorporated herein by reference.

BACKGROUND OF THE INVENTION

Field of the Invention

The present invention relates to a light source unit having an optical device having a diffusing layer and a dichroic layer, a projector, the optical device and an optical device manufacturing method.

Description of the Related Art

In these days, data projectors are used on many occasions as an image projection system which projects an image of a screen of a personal computer or a video image, as well as images based on image data which is stored on a memory card on to a screen. In these data projectors, light emitted from a light source is collected to a micromirror display device called a DMD (Digital micromirror Device) or a liquid crystal panel for display a color image on a screen.

Conventionally, the mainstream of these data projectors has been those which utilize a high-intensity discharge lamp as a light source. In recent years, however, there have been developed or proposed projectors that use as a light source a light emitting diode, a laser diode, an organic EL (electroluminescence) or a luminescent material. For example, the Japanese Unexamined Patent Publication No. 2011-154168 (JP-A-2011-154168) discloses a projector having a red light source device in which a red light emitting diode emits light in the red wavelength range, a green light source device in which a luminescent material layer laid out on a luminescent wheel emits light in the green wavelength range by light emitted from an excitation light source being shone on to the luminescent wheel, and a blue light source device which is made up of a blue light emitting diode.

Then, a dichroic mirror is disposed in a position where the axes of light emitted from the excitation light source and light emitted from the luminescent wheel intersect the axis of light emitted from the red light source device, and a dichroic mirror is also disposed in a position where the axis of light emitted from the red light source device intersects the axis of light emitted from the blue light source device. The dichroic mirror disposed in the position where the axis of light emitted from the excitation light source intersects the axis of light emitted from the red light source device transmits light in the red wavelength rage and light in the blue wavelength range which is emitted from the excitation light source and reflects light in the green wavelength range. In addition, the dichroic mirror disposed in the position where the axis of light emitted from the red light source device intersects the axis of light emitted from the blue light source device reflects light in the red wavelength range and light in the green wavelength range and transmits light in the blue wavelength range. Thus, these dichroic mirrors allow the light emitted from the excitation light source to be shone on to the luminescent wheel and the light in the red wavelength range emitted from the red light source device, the light in the green wavelength range which is the light emitted from the luminescent wheel and the light in the blue wavelength range emitted from the blue light source device to be shone on to a display device via a light guiding optical system.

In the projector disclosed in JP-A-2-11-154168, since light emitted from the blue laser light emitting device is shone directly on the luminescent material layer of the luminescent wheel without being diffused, there fears that burning is generated in the luminescent material layer, and it also becomes difficult to extend the life of the luminescent material layer.

As to light in the red wavelength range and light in the blue wavelength range which are emitted from the LEDs which are solid light emitting devices, unevenness in luminance may be generated in projected light, which is projected on a screen, leading to difficulty in enhancing the quality of a projected image.

Consequently, an object of the invention is to provide a light source unit which can ensure the degree of freedom in layout in an interior thereof while protecting a luminescent material layer of a luminescent wheel, a projector using the light source unit, an optical device making up the light source unit, and an optical device manufacturing method.

SUMMARY OF THE INVENTION

According to an aspect of the invention, there is provided a light source unit comprising a first light source having a solid light emitting device, a second light source having a luminescent material layer which emits light in a wavelength range which is different from light in a wavelength range emitted from the first light source by using the first light source as an excitation light source and an optical device which is disposed between the first light source and the second light source, wherein the optical device has a dichroic layer which transmits a pencil of light emitted from the first light source and reflects a pencil of light emitted from the second light source and a diffusing layer which diffuses the pencil of light emitted from the first light source.

According to another aspect of the invention, there is provided a projector having the light source described above, a display device configured to form image light, a light source side optical system configured to guide light from the light source unit to the display device, a projection side optical system configured to project the image light emitted from the display device on to a screen, and a projector control unit configured to control the display device and the light source unit.

According to a further aspect of the invention, there is provided an optical device comprising a layer holding member which is formed into a plate, a diffusing layer which is provided on one side surface of the layer holding member to diffuse incident light, and a dichroic layer which is provided on the other side surface of the layer holding member to transmit light in a predetermined wavelength range and reflect light in a predetermined wavelength range.

According to an aspect of the invention, there is provided an optical device manufacturing method including the steps of sandblasting one side surface of a base material to form a diffusing layer which diffuses incident light, and applying a dichroic coating to the other side surface of the base material to form a dichroic layer which transmits light in a predetermined wavelength range and reflects light in a predetermined wavelength range.

According to another aspect of the invention, there is provided an optical device manufacturing method comprising the steps of preparing a first layer holding member having a diffusing layer, preparing a second layer holding member having a dichroic layer, and joining the first layer holding member and the second layer holding member together so that the diffusing layer and the dichroic layer are exposed to the outside.

DETAILED DESCRIPTION OF THE PREFERRED EMBODIMENT

Hereinafter, a best mode for carrying out the invention will be described by the use of the accompanying drawings. Although the following embodiments have various preferred technical limitations for carrying out the invention, those technical limitations are not intended to limit the scope of the invention to the embodiments and illustrated examples.

First Embodiment

Figure 1:
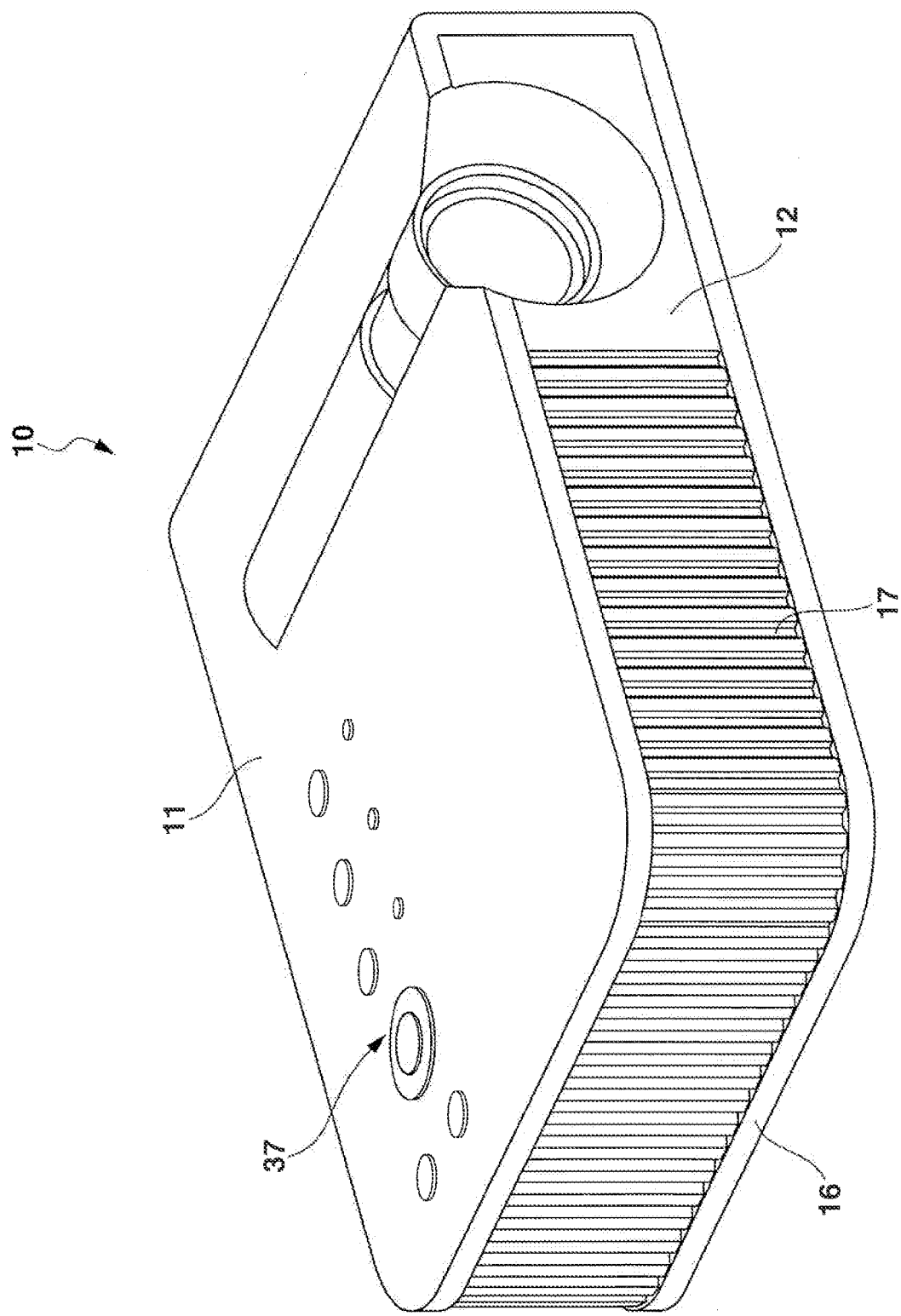
FIG. 1 is an external perspective view showing a projector according to a first embodiment of the invention.

Hereinafter, an embodiment of the invention will be described in detail based on the drawings. FIG. 1 is an external perspective view of a projector 10. In this embodiment, when left and right are referred to in relation to the projector 10, they denote, respectively, left and right with respect to a projecting direction, and when front and rear are referred to in relation to the projector 10, they denote, respectively, front and rear with respect to a direction towards a screen from the projector 10 and a traveling direction of a pencil of light emitted from the projector 10.

The projector 10 has a substantially rectangular parallelepiped shape as shown in FIG. 1. The projector 10 has a projecting portion to a side of a front panel 12 that is a front side panel of a projector casing. A plurality of inside air outlet ports 17 are provided in the front panel 12. Further, although not shown, the projector 10 has an Ir reception unit that receives a control signal from a remote controller.

In addition, a keys/indicators unit 37 is provided on an upper case 11 of the casing. Disposed on this keys/indicators unit 37 are keys and indicators which include a power indicator, a projection switch key, an overheat indicator, and the like. The power indicator informs whether a power switch key or a power supply is on or off. The projection switch key is configured to switch a projection on or off. The overheat indicator informs of an overheat condition occurring in a light source unit, a display device, a control unit or the like when they really overheat. Additionally, the upper case 11 covers an upper surface and part of a left side surface of the casing of the projector 10. The upper case 11 is configured so as to be removed from a lower case 16 to deal with a failure or the like when it really occurs.

Further, an input/output connector unit where USB terminals, an image signal inputting D-SUB terminal where analog RGB image signals are inputted, an S terminal, an RCA terminal, a voice output terminal and the like are provided and various types of terminals including a power supply adaptor plug are provided on a back panel, not shown, at the rear of the casing. Additionally, a plurality of outside air inlet ports are formed in the back panel.

Figure 2:
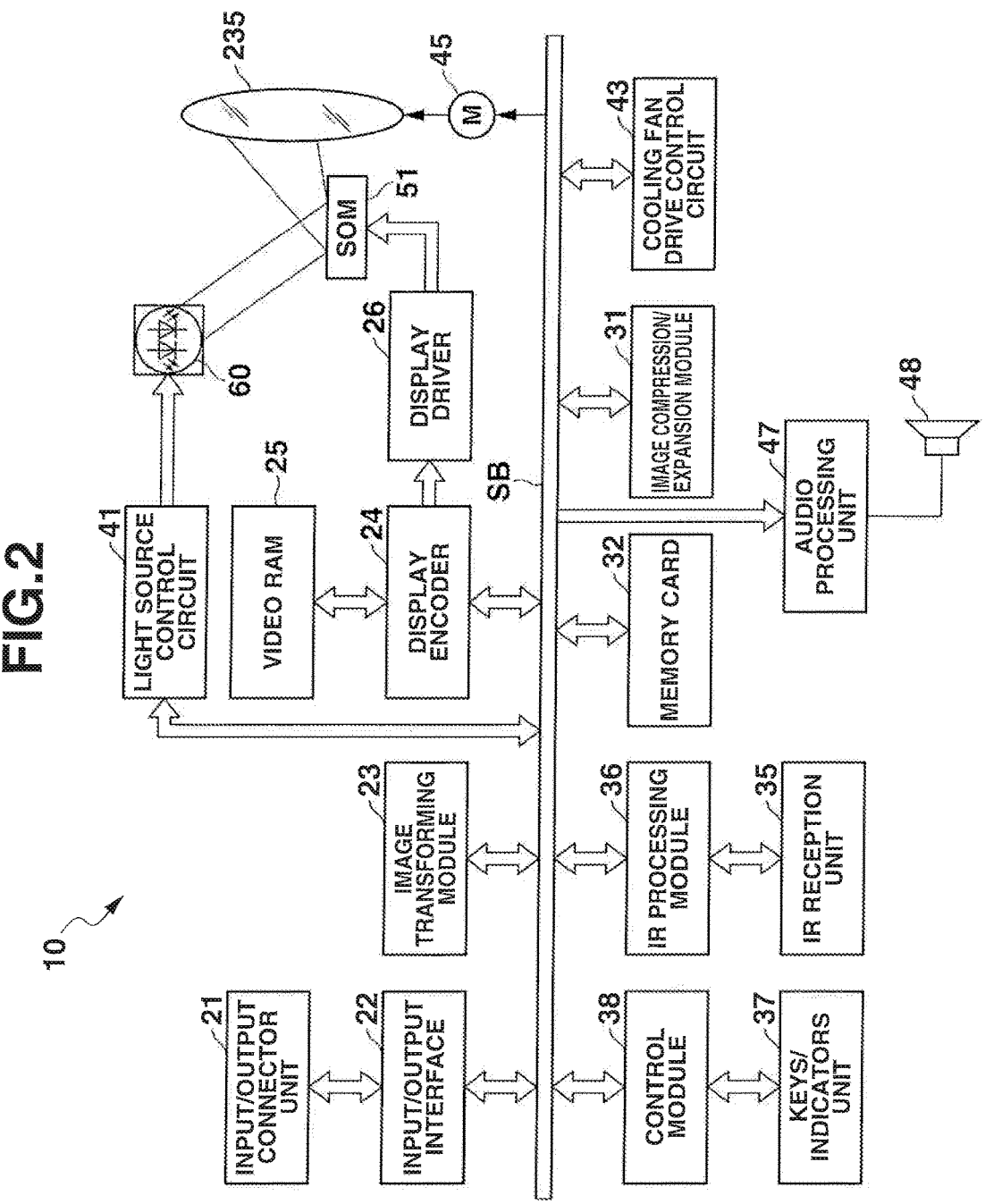
FIG. 2 is a functional block diagram of the projector according to the first embodiment of the invention.

Next, a projector control unit of the projector 10 will be described by the use of a functional block diagram shown in FIG. 2. The projector control unit includes a control module 38, an input/output interface 22, an image transforming module 23, a display encoder 24, a display driver 26 and the like.

This control module 38 governs the control of operations of circuitries within the projector 10 and is made up of a CPU, a ROM which stores in a fixed fashion operation programs of various types of settings, a RAM which is used as a working memory, and the like.

Image signals of various standards that are inputted from an input/output connector unit 21 are sent via the input/output interface 22 and a system bus (SB) to the image transforming module 23 where the image signals are transformed so as to be unified into an image signal of a predetermined format which is suitable for display by the projector control unit. Thereafter, the image signals so transformed are outputted to the display encoder 24.

The display encoder 24 deploys the image signals that have been inputted thereinto on a video RAM 25 for storage therein and generates a video signal from the contents stored in the video RAM 25, outputting the video signal so generated to the display driver 26.

The display driver 26 functions as a display device control module and drives a display device 51, which is a spatial optical modulator (SOM), at an appropriate frame rate in response to the image signal outputted from the display encoder 24. In this projector 10, a pencil of light that is emitted from a light source unit 60 is shone onto the display device 51 via a light source side optical system, whereby an optical image is formed by using reflected light reflected by the display device 51. The image so formed is then projected on to a screen, not shown, for display thereon via a projection side optical system. A movable lens group 235 of the projection side optical system is driven by a lens motor 45 for zooming or focusing.

An image compression/expansion module 31 performs a recording process of data compressing a brightness signal and a color difference signal of the image signal to be sequentially written on a memory card 32, that is a detachable recording medium, through operations using ADCT and the Huffman method.

Further, when in a reproducing mode, the image compression/expansion module 31 reads out the image data recorded on the memory card 32 and expands individual image data which make up a series of dynamic images frame by frame. Then, the image compression/expansion module 31 outputs the image data to the display encoder 24 via the image transforming module 23 so as to enable the display of dynamic images and the like based on the image data stored on the memory card 32.

Operation signals generated at the keys/indicators unit 37 which includes the keys and the indicators which are provided on the upper case 11 of the casing are sent out directly to the control module 38. Key operation signals from the remote controller are received by the Ir reception unit 35, and cord signals are demodulated by an Ir processing module 36 to be outputted to the control module 38.

An audio processing unit 47 is connected to the control module 38 via the system bus (SB). This audio processing unit 47 includes a circuitry for a sound source such as a PCM sound source. When in a projection mode and a reproducing mode, the audio processing unit 47 converts audio data into analog signals and drives a speaker 48 to output loudly sound or voice based on the audio data.

The control module 38 controls a light source control circuit 41 which is configured as a light source control unit. This light source control circuit 41 controls separately and individually the emission of light in the red wavelength range, light in the green wavelength range and light in the blue wavelength range from a red light source device, a green light source device, and a blue light source device, respectively, in the light source unit 60 so that lights in the predetermined wavelength ranges which are required when an image is generated are emitted from the light source unit 60.

The control module 38 causes a cooling fan drive control circuit 43 to detect temperatures through a plurality of temperature sensors which are provided in the light source unit 60 and the like so as to control the rotating speeds of cooling fans based on the results of the temperature detections. The control module 38 also controls the cooling fan drive control circuit 43 so that the cooling fans continue to rotate even after the power supply to the projector 10 itself is turned off through a timer or the power supply to the projector 10 itself is turned off depending upon the results of the temperature detections by the temperature sensors.

Figure 3:
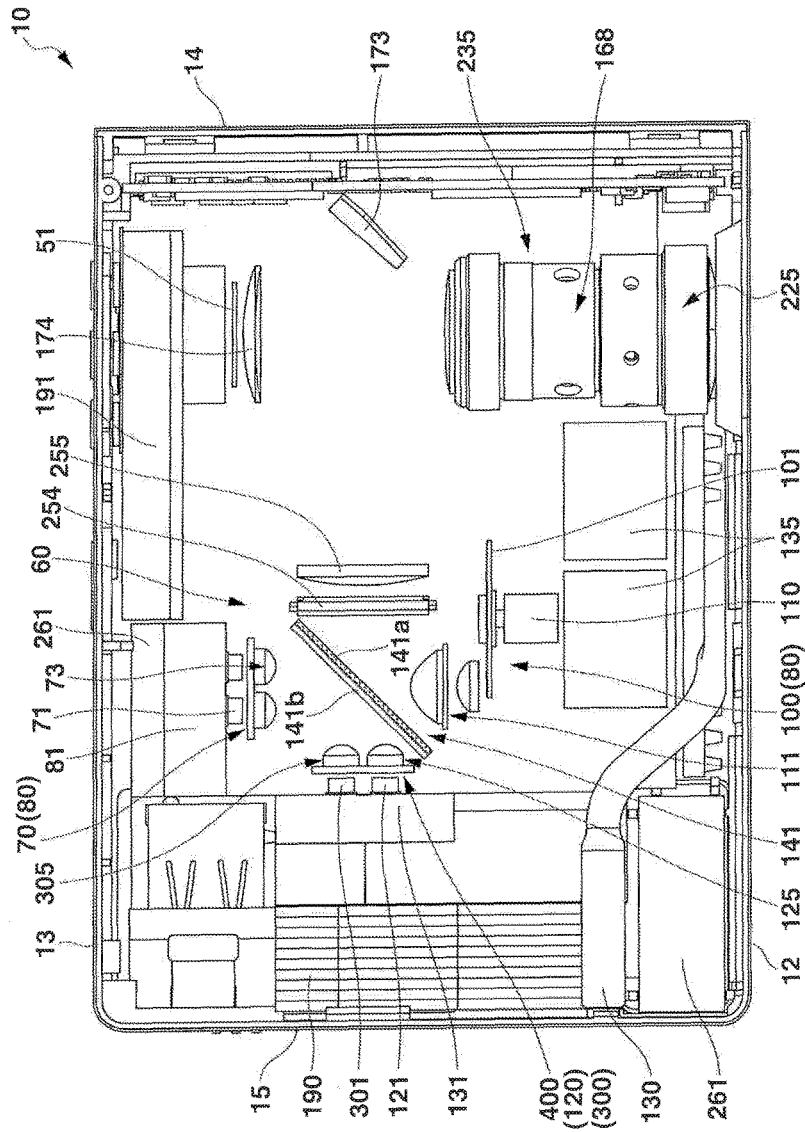
FIG. 3 is a schematic plan view showing an internal construction of the projector according to the first embodiment of the invention.

Next, an internal construction of the projector 10 will be described. FIG. 3 is a schematic plan view showing the internal construction of the projector 10. The light source unit 60 of the projector 10 includes a first light source 70, a second light source 100, a third light source 400, and a layer holding member 141 which is an optical device (an optical unit). Additionally, in the projector 10, a microlens array 254, a collective lens 255, a light axis changing mirror 173 and a condenser lens 174 are disposed as the light source side optical system. Further, the projector 10 includes a projection side optical system 168.

As shown in FIG. 3, in the projector 10, the light source unit 60 is provided at a central portion, and the projection side optical system 168, which includes a lens barrel 225, is provided at a left side portion in the interior thereof. The projector 10 also includes a display device 51 made up of DMDs between the lens barrel 225 and a back panel 13. The projector 10 includes further a main control circuit board, not shown.

The light source unit 60 includes the first light source 70, the second light source 100, the third light source 400 and the layer holding member 141. The first light source 70 is disposed substantially in a central portion in relation to a left-to-right direction of the casing of the projector 10. The second light source 100 functions as a luminescent wheel which is disposed on an axis of light emitted from the first light source 70 and near the front panel 12. The third light source 400 is made up of a blue light source device 300 and a red light source device 120 which are disposed side by side between the first light source 70 and the second light source 100. The layer holding member 141 will be described later.

The projector 10 includes a heat sink 191 between the display device 51 and the back panel 13, and this heat sink 191 cools the display device 51. Additionally, the projector 10 includes heat sinks 131, 190 between the light source unit 60 and a right side panel 15, and the heat sinks 131, 190 cool a red light source 121 and a blue light source 301.

The first light source 70 includes excitation light sources 71 made up of solid light emitting devices which are disposed so that axes of lights emitted therefrom become at right angles to the back panel 13 and a heat sink 81 which is disposed between the excitation light sources 71 and the back panel 13.

The excitation light sources 71 are made up of two blue laser diodes which are solid light emitting devices and are disposed side by side. Collimator lenses 73 are disposed individually on axes of lights emitted from the two blue laser diodes, and the collimator lenses 73 are collective lenses which convert lights emitted from the individual blue laser diodes into parallel lights.

A cooling fan 261 is disposed between the heat sink 81 and the back panel 13. This cooling fan 261 functions as a blower fan which blows in outside air as a cooling medium towards the heat sink 81. The excitation light sources 71 are cooled by this cooling fan 261 and the heat sink 81.

A green light source device 80 is made up of the second light source 100 which is a luminescent wheel device and the first light source 70 which functions as an excitation light source. The second light source 100 includes a luminescent wheel 101 which is disposed so as to be at right angles to the axis of light emitted from the first light source 70, a wheel motor 110 which drives to rotate the luminescent wheel 101, and a collective lens 111 which collects a pencil of light which is emitted from the luminescent wheel 101 in the direction of the back panel 13.

The luminescent wheel 101 is made of a circular disc-shaped metallic base material. An annular luminescent light emitting area is formed on the metallic base material as a recess portion, and this annular luminescent light emitting area emits luminescent light in the green wavelength range by using light emitted from the excitation light sources 71 as excitation light. Thus, the recessed luminescent light emitting area functions as a luminescent material which receives excitation light to emit luminescent light. A surface of the luminescent wheel 101 including the luminescent light emitting area which faces the excitation light sources 71 is mirror finished through sliver deposition or the like to form a light reflecting surface, and a layer of a green luminescent material is laid out on the reflecting surface.

Light which is emitted from the first light source 70 to be shone on to the green luminescent material layer of the luminescent wheel 101 excites the green luminescent material in the green luminescent material layer. Pencils of light which are emitted in every direction from the green luminescent material are emitted directly towards the excitation light sources 71 or towards the excitation light sources 71 after having been reflected on the reflecting surface of the luminescent wheel 101. A heat sink 130 and a cooling fan 135 are disposed between the wheel motor 110 and the front panel 12, and the luminescent wheel 101 is cooled by the heat sink 130 and the cooling fan 135.

The blue light source device 300 and the red light source device 120, which make up the third light source 400, are provided side by side so that the axes of lights emitted from the blue light source device and the red light source device 120 intersect the axes of lights emitted from the excitation light sources 71 at right angles. The blue light source device 300 of the light source unit 60 includes the blue light source 301 and a collimator lens 305 which collects light emitted from the blue light source 301 to a predetermined range for emission. Additionally, the red light source device 120 of the light source unit 60 includes the red light source 121 and a collimator lens 125 which collects light emitted from the red right source 121 to a predetermined range for emission. The blue light source device 300 and the red light source device 120 are disposed so that the axes of lights emitted therefrom intersect with the axes of light emitted from the first light source 70 and light in the green wavelength range emitted from the luminescent wheel 101.

The blue light source 301 is a blue laser diode as a solid light emitting device which emits light in the blue wavelength range. The red light source 121 is a red laser diode as a solid light emitting device which emits light in the red wavelength range. The blue light source device 300 and the red light source device 120 include the heat sinks 131, 190 which are disposed near the blue light source 301 and the red light source 121.

A cooling fan 261 is disposed between the heat sinks 131, 190 and the front panel 12, and this cooling fan 261 functions as a suction fan which sucks in a cooling medium which is sent in by the blower fan and is warmed up by the heat sinks 131, 190 to discharge it to the outside of the projector 10. This cooling fan 261 cools the red light source 121 and the blue light source 301.

In the light source unit 60, the layer holding member 141 is disposed in a position where the axis of light in the blue wavelength range which is excitation light emitted from the first light source 70 and the axis of light in the green wavelength range emitted from the luminescent wheel 101 intersect with the axes of light in the red wavelength range and light in the blue wavelength range which are emitted from the third light source 400.

The layer holding member 141 is formed into a plate. A diffusing layer 141a is provided on one side surface of the layer holding member 141, while a dichroic layer 141b is provided on the other side surface of the layer holding member 141. In this embodiment, the layer holding member 141 is disposed so that light emitted from the first light source 70 and light emitted from the third light source 400 are incident on the surface where the dichroic layer 141b is provided.

The layer holding member 141 is formed of a single glass plate which functions as a base material. The diffusing layer 141 is formed by sandblasting the one side surface of the base material into a surface on which minute irregularities are formed. On the other hand, the dichroic layer 141b is formed by applying a dichroic coating to the other side surface of the base material.

Specifically, this dichroic layer 141b is characterized in that the dichroic layer 141b transmits light in the red wavelength rang and light in the blue wavelength range and reflects light in the green wavelength range. Consequently, the dichroic layer 141b transmits light emitted from the first light source 70 and lights emitted from the third light source 400 and reflects light emitted from the second light source 100 in such a way that the direction of the axis of light emitted from the second light source 100 is changed by 90 degrees in the direction of a left panel 14.

To describe this in detail, light in the blue wavelength range which is excitation light emitted from the first light source 70 passes through the dichroic layer 141b. The light in the blue wavelength range which is excitation light which passes through the dichroic layer 141b is incident on the diffusing layer 141a from a back side of the diffusing layer 141a. Then, the light in the blue wavelength range which is excitation light which is incident on the diffusing layer 141a is diffused by the minute irregularities formed on the surface of the diffusing layer 141a and is then emitted from the surface of the diffusing layer 141a in the direction of the luminescent wheel 101. Then, the excitation light as diffused pencils of light emitted from the surface of the diffusing layer 141a is shone on to the luminescent material layer of the luminescent wheel 101 through the collecting lens group 111.

Similarly, light in the red wavelength range and light in the blue wavelength range which are emitted, respectively, from the red light source device 120 and the blue light source device 300 of the third light source 400 also pass through the dichroic layer 141b and are emitted from the surface of the diffusing layer 141a in the direction of the left panel 14 as diffused pencils of light.

On the other hand, light in the green wavelength range which is emitted from the second light source 100 is incident on the diffusing layer 141a of the layer holding member 141. The light in the green wavelength range which is incident on the diffusing layer 141a is reflected by the dichroic layer 141b while being diffused by the surface having the minute irregularities formed thereon. The light in the green wavelength range which is reflected by the dichroic layer 141b is incident again on the diffusing layer 141a to be emitted from the surface of the diffusing layer 141a in the direction of the left panel 14. In this way, the light in the green wavelength range which is emitted from the second light source 100 is reflected while being diffused by the dichroic layer 141b of the layer holding member 141 in such a way that the direction of the axis of the light in the green wavelength range is changed by 90 degrees.

The microlens array 254 is disposed on a side of the layer holding member 141 which faces the left panel 14, and this microlens array 254 diffuses the lights emitted from the individual light sources to a predetermined range and makes uniform a luminance distribution of each of the lights. The microlens array 254 is made up of planoconvex aspheric or biconvex microlenses which are arranged into a lattice or hexagonal lattice configuration. The collective lens 255 is disposed near the microlens array 254, and the diffused uniform light from the microlens array 254 passes through this collective lens 255 which collects the diffused uniform light to an effective size for the display device 51.

Consequently, in guiding the pencil of light whose intensity distribution is made uniform by the microlens array 254 to the display device 51, the pencil of light can be emitted to the light axis changing mirror 173 via the collective lens 255.

The condenser lens 174 shines the light source lights which are reflected by the light axis changing mirror 173 on to the display device 51 effectively. The heat sink 191 is disposed between the display device 51 and the back panel 13 so as to cool the display device 51.

The lens barrel 225 of the projection side optical system 168 has a lens group which projects "on" light which is reflected by the display device 51 on to a screen. This projection side optical system 168 is a variable-focus lens with a zooming function which includes fixed lens group incorporated in the lens barrel 225 and a movable lens group 235 incorporated in a movable lens barrel. The movable lens group can be moved by the lens motor for zooming or focusing.

Figure 4:
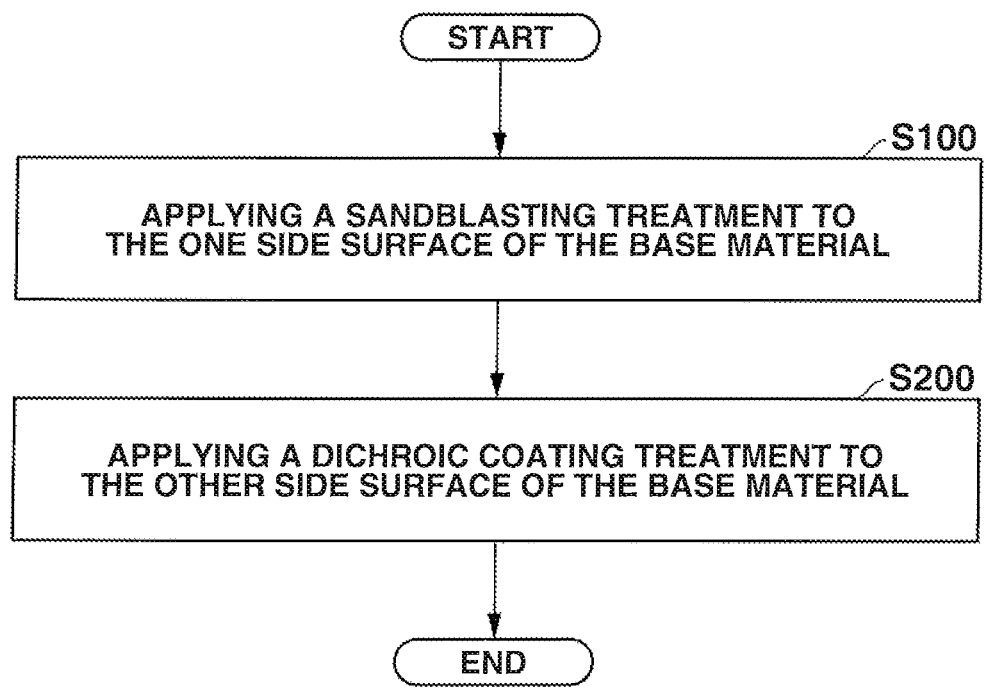
FIG. 4 is a flowchart of an optical device manufacturing method according to the first embodiment of the invention.

Next, referring to FIG. 4, a method for fabricating the layer holding member 141 will be described. Firstly, a transparent glass plate which constitutes the base material of the layer holding member 141 is prepared. As a step of forming a diffusing layer, a sandblasting treatment is applied to one side surface of the base material to thereby form a diffusing layer (step S100). Next, as a step of forming a dichroic layer, a dichroic coating treatment is applied to the other side surface of the base material to thereby form a dichroic layer (step s200). In this way, the layer holding member 141 of this embodiment is fabricated.

Here, it is possible to perform the dichroic layer forming step in step S200 first and thereafter to perform the diffusing layer forming step in step S100. However, in case the dichroic layer forming step is performed first and thereafter the diffusing layer forming step is performed, there are fears that the dichroic coating applied first is affected badly by the sandblasting treatment performed later, and therefore, as shown in a flowchart in FIG. 4, it is preferable that the dichroic layer forming step is performed after the diffusing layer forming step has been performed.

Second Embodiment

Figure 5:
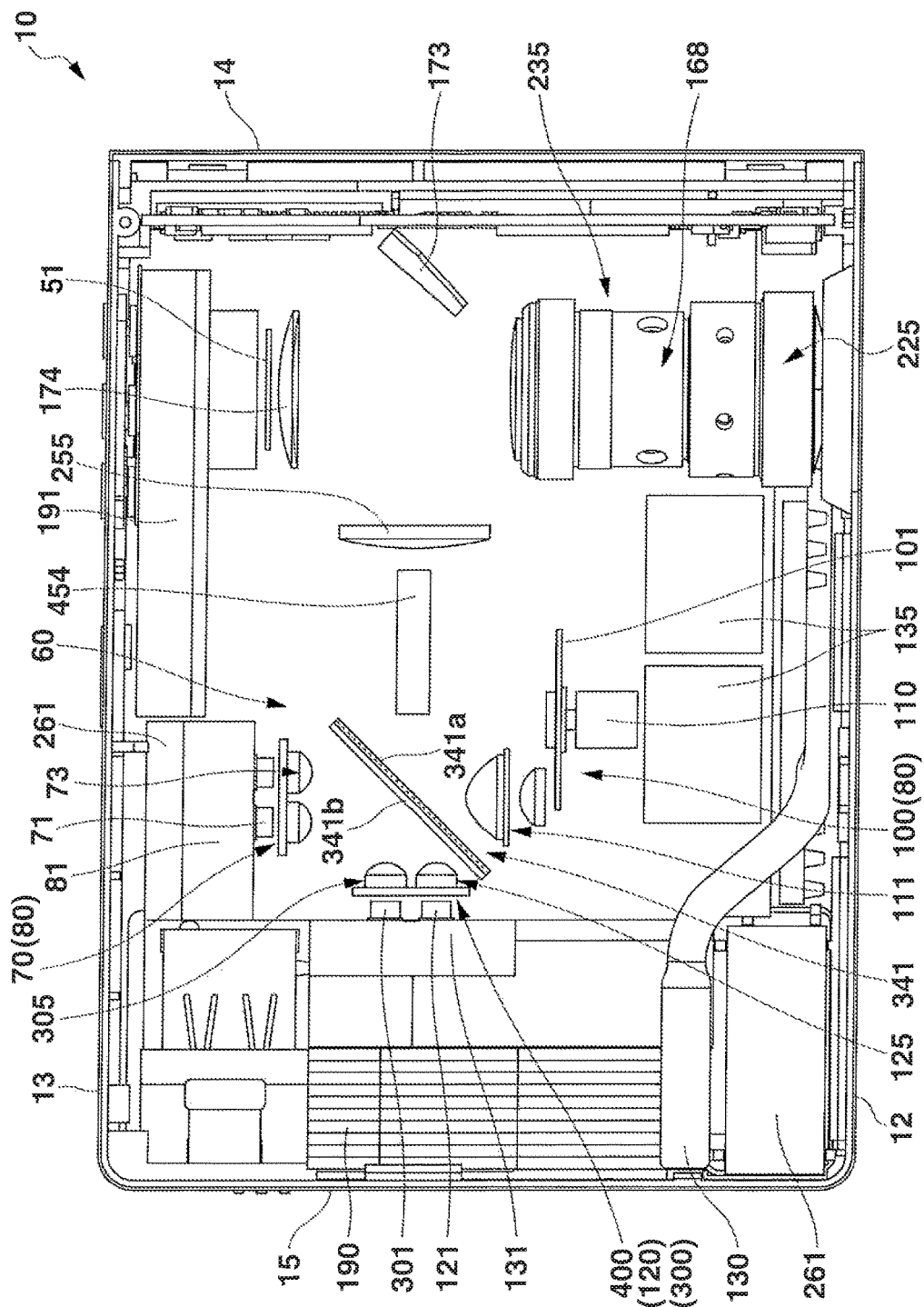
FIG. 5 is a schematic plan view showing an internal construction of a projector according to a second embodiment of the invention.

Next, referring to FIG. 5, a second embodiment of the invention will be described. In the second embodiment, a layer holding member 341 is disposed in place of the layer holding member 141 of the first embodiment. Additionally, a light tunnel 454 is used in place of the microlens array 254 in the first embodiment. The other configurations of the second embodiment remain the same as those of the first embodiment, and therefore, the same reference numerals in the first embodiment will be given to the same configurations in the second embodiment as those of the first embodiment, and the description thereof will be omitted herein.

The layer holding member 341 of this embodiment is formed into a plate by joining a first layer holding member 341a and a second layer holding member 341b together. A diffusing layer, which is the same as the diffusing layer 141a of the first embodiment, is formed on a surface of the first layer holding member 341a. Similarly, in the second layer holding member 341b, a dichroic layer, which is the same as the dichroic layer 141b of the first embodiment, is formed on a surface thereof. In other words, the first layer holding member 341a is formed as a diffuse transmission plate, and the second layer holding member 341b is formed as a dichroic mirror. Then, the layer holding member 341 is formed by joining together the first layer holding member 341a which is the diffuse transmission plate and the second layer holding member 341b which is the dichroic mirror.

As with the first embodiment, the layer holding member 341 is disposed so that light emitted from a first light source 70 and lights emitted from a third light source 400 are incident on the surface of the second layer holding member 341b where the dichroic layer is provided.

The function of the layer holding member 341 is similar to the function of the layer holding member 141 of the first embodiment. Namely, light in the blue wavelength range which is excitation light emitted from the first light source 70 passes through the dichroic layer of the second layer holding member 341b and further passes through the diffusing layer of the first layer holding member 341a, whereby the light in the blue wavelength range or excitation light is emitted from the surface of the diffusing layer as a diffused pencil of light. The excitation light which is emitted as the diffused pencil of light is shone on to a luminescent material layer of a luminescent wheel 101.

Similarly, light in the red wavelength range and light in the blue wavelength range which are emitted from the third light source 400 also pass through the dichroic layer of the second layer holding member 341b and further pass through the diffusing layer of the first layer holding member 341a, whereby the light in the red wavelength range and the light in the blue wavelength range are emitted from the surface of the first layer holding member 341a as diffused pencils of light. On the other hand, light in the green wavelength range emitted from a luminescent material layer of the luminescent wheel 101 of a second light source 100 is reflected by the dichroic layer of the second layer holding member 341b in such a way that the direction of the axis of the light in the green wavelength range is changed by 90 degrees and is emitted from the surface of the diffusing layer of the first layer holding member 341a as a diffused pencil of light.

In this way, the lights in the red, blue and green wavelength ranges which are emitted in the same direction by the layer holding member 341 are incident on the light tunnel 454. The lights in the red, blue and green wavelength ranges are uniformly diffused by the light tunnel 454 and are then shone on to the display device 51 by the collective lens 255, the light axis changing mirror 173 and the condenser lens 174 which make up the light source side optical system. In this way, projected image light projected by the projector 10 is projected as projected light which is free from unevenness and is clear.

Figure 6:
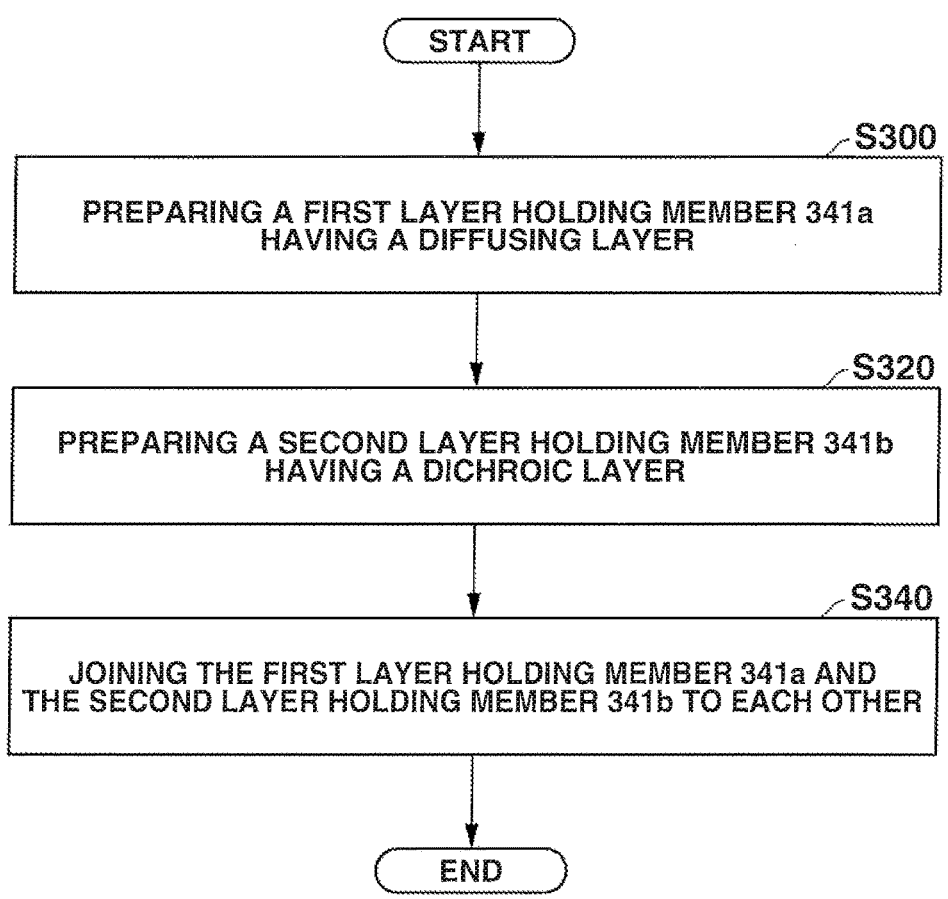
FIG. 6 is a flowchart of an optical device manufacturing method according to the second embodiment of the invention.

Next, a method for fabricating the layer holding member 341 of this embodiment will be described by reference to FIG. 6.

One side surface of a first base material which is a base material of a transparent glass plate is sandblasted to form a diffusing layer, and a first layer holding member 341a is prepared (step S300). Similarly, a dichroic coating is applied to one side surface of a second base material which is a base material of a transparent glass plate to form a dichroic layer, and a second layer holding member 341b is prepared (step S320). As this occurs, the other side surfaces of the first layer holding member 341a and the second layer holding member 341b are not surface treated and are left as they are. Next, the other side surfaces of the first layer holding member 341a and the second layer holding member 341b are joined to each other with an adhesive so that the diffusing layer and the dichroic layer thereof are exposed to the outside (step s340). The layer holding member 341 is fabricated in this way.

Here, it is preferable that a groove where to apply the adhesive is formed on each of the joining surfaces of the layer holding member 341 which is formed by affixing the two glass plate together. This is because in case the adhesive remains sticking to the joining surfaces, the optical path of a pencil of light which passes through the layer holding member or which is reflected by the layer holding member is badly affected. The layer holding member 341 may be formed by disposing the first layer holding member 341a and the second layer holding member 341b close to each other with a space defined therebetween without joining them together.

Third Embodiment

Figure 7:
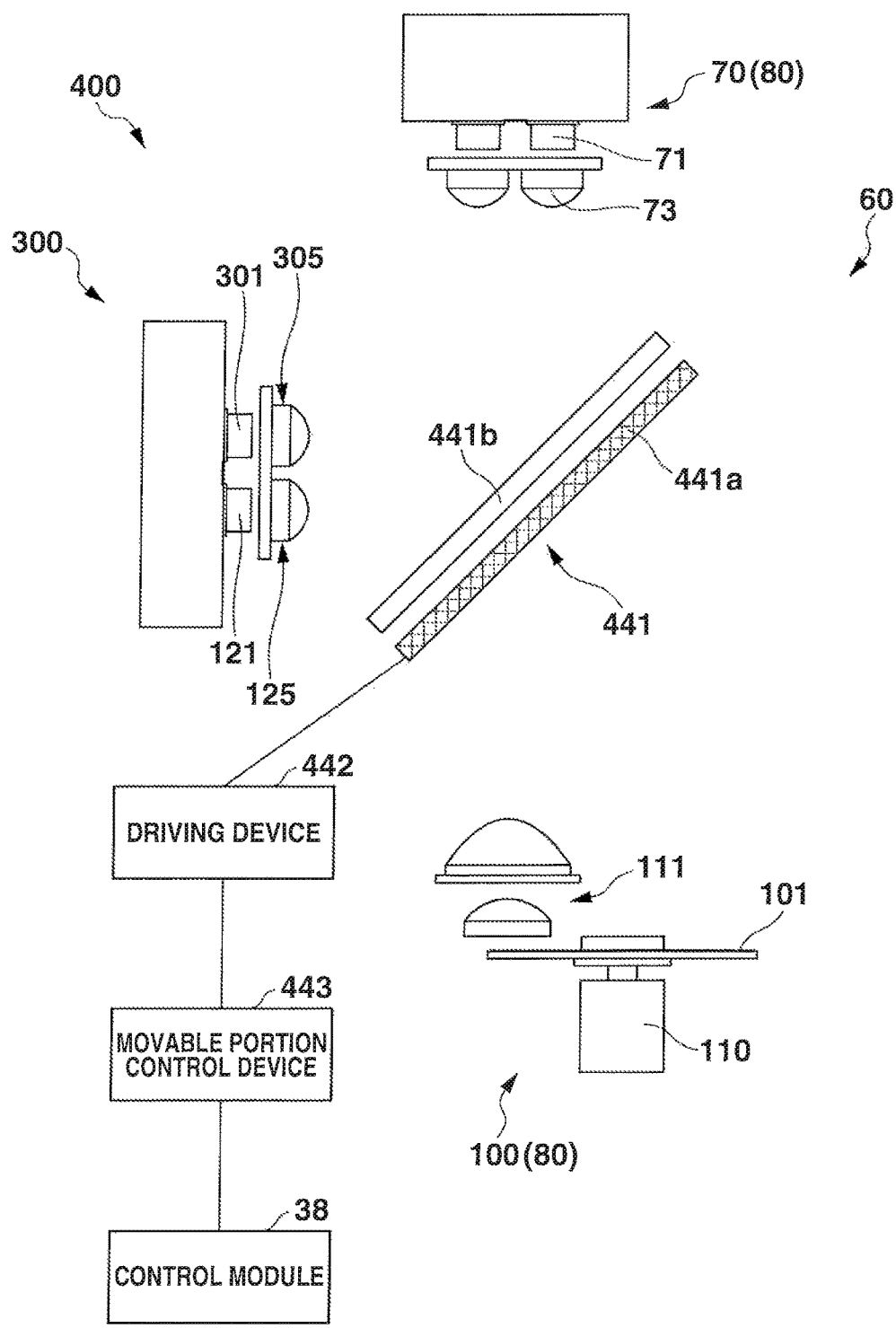
FIG. 7 is a schematic plan view showing a layer holding member and a functional block of a projector according to a third embodiment of the invention.

Next, referring to FIG. 7, a third embodiment will be described. In this embodiment, a layer holding member 441 is used in place of the layer holding member 341 of the second embodiment. In the following description, the same reference numerals will be given to the same configurations in the third embodiment as those of the second embodiment, and the description thereof will be omitted herein. The layer holding member 441 of this embodiment is made up of a first layer holding member 441a which has a diffusing layer and which is formed into a plate and a second layer holding member 441b which has a dichroic layer and which is formed into a plate.

As with the second embodiment described above, the first layer holding member 441a and the second layer holding member 441b have the diffusing layer and the dichroic layer which are formed on one side surfaces thereof, respectively. The first layer holding member 441a and the second layer holding member 441b are disposed to lie close to each other while being allowed to move relative to each other. Specifically, the second layer holding member 441b having the dichroic layer is fixed to a casing of a projector 10. The first layer holding member 441a having the diffusing layer is made to move by a moving guide, not shown, while lying close to the second layer holding member 441b.

In addition, the layer holding member 441 is disposed in a similar fashion to the second embodiment. Namely, the second layer holding member 441b having the dichroic layer is disposed on a side of the layer holding member 441 where pencils of light from a first light source 70 and a third light source 400 are incident. Here, the first layer holding member 441a is moved along the moving guide or the like by a driving device 442. For example, a piezo-electric device or a linear guide can be used for the driving device 442. The driving device 442 is connected to a movable portion control device 443 to thereby be controlled. The movable portion control device 443 is connected to a control module 38.

The function of the layer holding member 441 is similar to that of the layer holding member 341 of the second embodiment. Namely, the layer holding member 441 is disposed so that light in the blue wavelength range which is emitted from the first light source 70 and lights in the red and blue wavelength ranges which are emitted from the third light source 400 are incident on the second layer holding member 441b having the dichroic layer. The dichroic layer transmits the lights in the red and blue wavelength ranges and reflects light in the green wavelength range which is emitted from a second light source 100. The lights in the red and blue wavelength ranges which pass through the second layer holding member 441b and the light in the green wavelength range which is reflected by the second layer holding member 441b pass through the first layer holding member 441a having the diffuse layer to thereby be diffused.

Minute reciprocating motions (vibrations) are given to the first layer holding member 441a along the moving guide or the like by the driving device 442. Then, image lights based on the lights in the red and blue wavelength ranges which are emitted from the solid light emitting devices and which pass through the diffusing layer are projected on to a screen while the speckle is being reduced. This is preferable particularly for a blue light source device 300 of the first light source 70 which is made to be blue laser diodes.

In general, when a coherent beam like a laser beam is shone on to the diffusing surface, a speckle appears which produces a dot pattern. The speckle is a phenomenon in which coherent lights scattering at each spots on a diffusing surface are interfered with one another by virtue of random-phase relationships caused by plenty of microscopic unevenness on the diffusing surface. Consequently, in this embodiment, vibrations are given to the first layer holding member 441a which has the diffusing layer. This functions so as to change the phase relationships on the diffusing surface as required, thereby reducing the speckle.

An integral layer holding member similar to the layer holding members 141, 341 of the first and second embodiments can also be used in this embodiment. As this occurs, a diffusing layer and a dichroic layer are provided integrally on the layer holding member in such a way as to be opposite to each other, and therefore, the dichroic layer is also moved as the diffusing layer is moved. However, in order to allow the dichroic layer to function sufficiently, light is required to be incident thereon accurately at a specified incident angle. Consequently, when the dichroic layer is moved together with the diffusing layer, the driving device which drives to move the layer holding member needs to be formed accurately.

Thus, while the embodiments of the invention have been described heretofore, the invention is not limited thereto and hence can be altered as required. For example, in the embodiments described heretofore, the layer holding members 141, 341, 441 are described as being disposed to be oriented so that light in the blue wavelength range which is emitted from the first light source 70 which is the excitation light source and light in the red wavelength range and light in the blue wavelength range which are emitted from the third light source 400 are incident thereon.

However, the invention is not limited to the disposition of the layer holding members 141, 341, 441 described above. In place of this, the layer holding member can be reversed from the disposed state described above so that light in the blue wavelength range emitted from the first light source 70 and lights in the red and blue wavelength ranges emitted from the third light source 400 are incident on the surface of the layer holding member where the diffusing surface is provided. As this occurs, however, luminescent light which is light in the green wavelength range emitted from the second light source 100 is reflected by the dichroic layer of the layer holding member without passing through the diffusing layer, and therefore, the light in the green wavelength range is not diffused by the diffusing layer. Consequently, as in the embodiments described heretofore, the layer holding members 141, 341, 441 are preferably disposed so that light in the blue wavelength range emitted from the first light source 70 and lights in the red and blue wavelength ranges emitted from the third light source 400 are incident on the dichroic layer.

Additionally, in the embodiments of the invention, the third light source 400 is described as being made up of the red light source device 120 and the blue light source device 300. The red light source device 120 has the red light source 121 which is the red laser diode which is the solid light emitting device, and the blue light source device 300 has the blue light source 301 which is the blue laser diode which is the solid light emitting device. However, in place of this configuration, a high-intensity red or blue light emitting diode (LED) can also be used for the solid light emitting device of the third light source 400. In this way, the third light source 400 should include at least a solid light emitting device which emits light in a wavelength range which is different from the wavelength range of the light emitted from the first light source 70.

Fourth Embodiment

In the embodiments of the invention which have been described heretofore, the third light source 400 is described as being made up of the red light source device 120 and the blue light source device 300.

However, in place of this configuration, an optical system may be adopted in which a third light source 400 includes, as its solid light emitting device, either of a red light source device 120 or a blue light source device 300, and the other solid light emitting device which is the other, not included in the third light source 400, of the red light source device 120 or the blue light source device 300 is disposed in a different position so that light emitted from either of the red light source 120 or the blue light source 300 which is included in the third light source 400 and light emitted from the other of the red light source device 120 or the blue light source device 300 which is disposed in the different position are combined together later.

Figure 8:
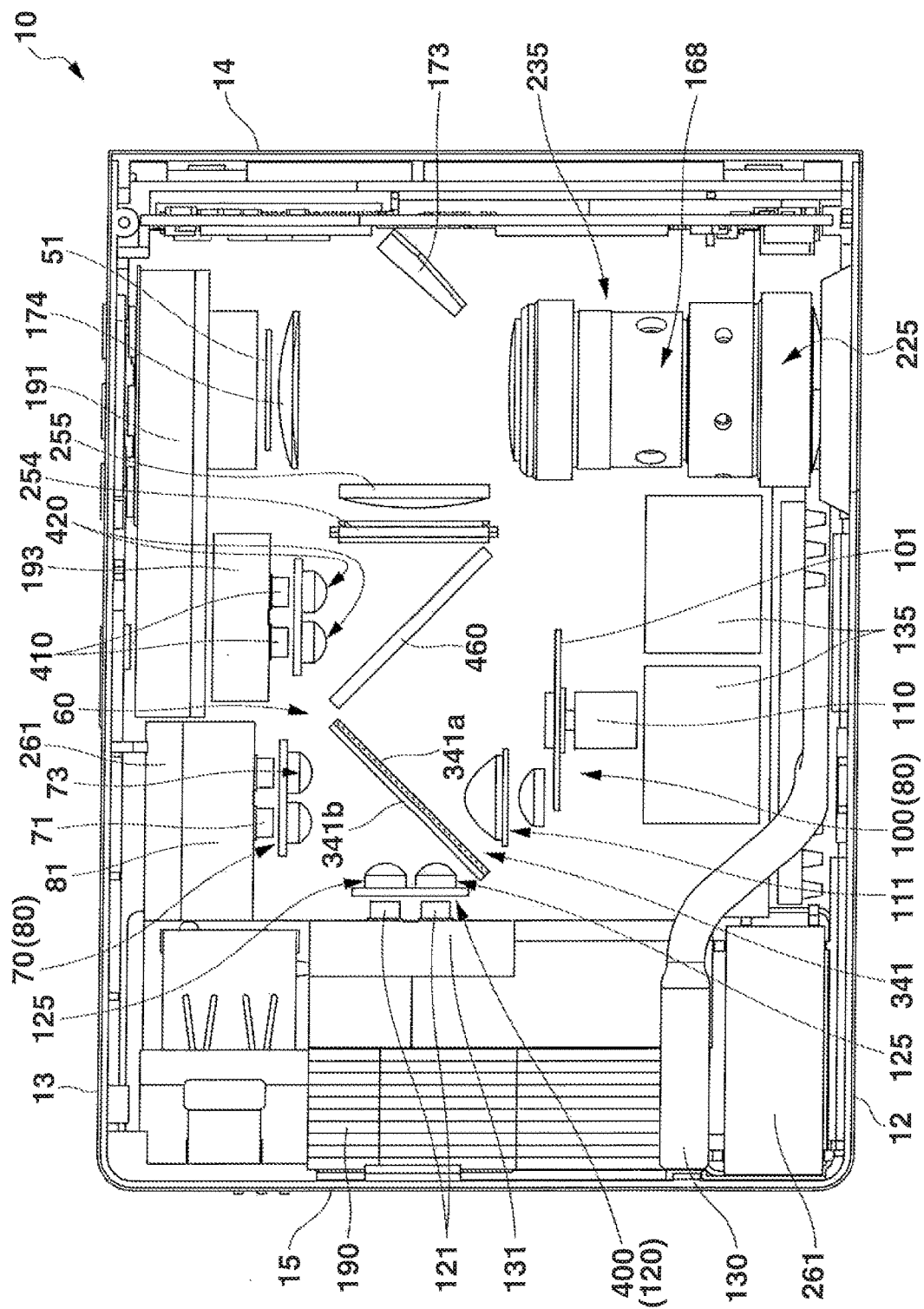
FIG. 8 is a schematic plan view showing an internal construction of a projector according to a fourth embodiment of the invention.

FIG. 8 shows a configuration example when the aforesaid configuration is really adopted. In this configuration, a third light source 400 includes only a red light source device 120 as its solid light emitting device. Blue light emitting diodes 410 are disposed on a side of a layer holding member 341 which faces a display device 51 together with a heat sink 193 and a collective lens group 420. Additionally, a dichroic mirror 460 is disposed between the layer holding member 341 and a collective lens 255, and this dichroic mirror 460 is characterized in that the dichroic mirror 460 transmits lights in the red and green wavelength ranges and reflects light in the blue wavelength range. The other configurations are the same as those of the first embodiment, and hence, the same reference numerals will be given to the same configurations in the fourth embodiment as those of the first embodiment, and the description thereof will be omitted herein.

In FIG. 8, the light emitting diodes are used as a blue light source. Therefore, compared with a case where laser diodes are used, the necessity of diffusing a pencil of light emitted from each of the light emitting diodes is not so high.

In place of the dichroic mirror 460, an optical device having a diffusing layer similar to that of the first embodiment may be used. As this occurs, it is desirable from the viewpoint of diffusing also pencils of blue light that the optical device is disposed so that the diffusing layer is oriented towards the blue light emitting diodes 410.

Fifth Embodiment

Additionally, a configuration may be adopted in which the whole of a third light source 400 is disposed on a side of a layer holding member which faces a display device 51.

Figure 9:
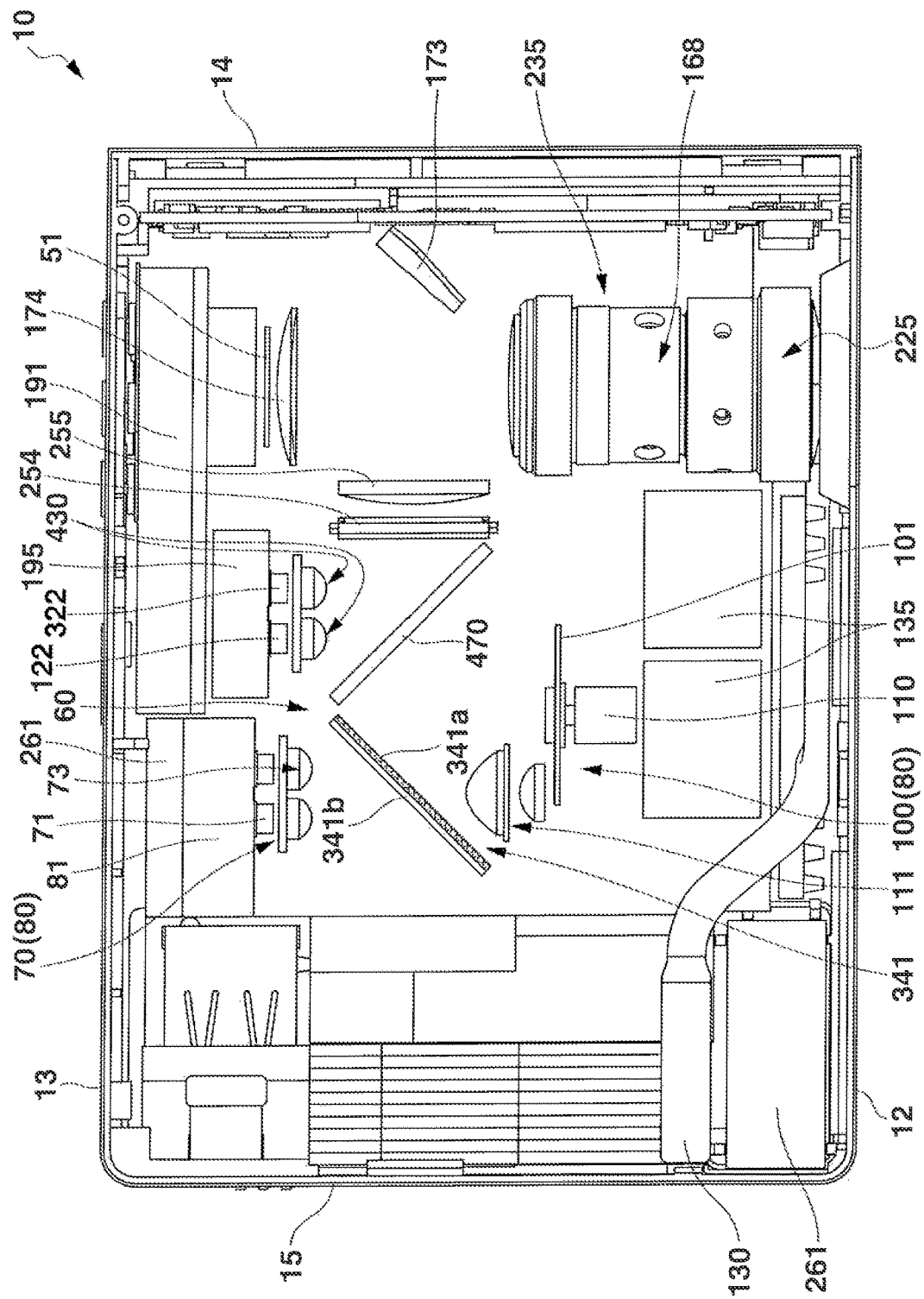
FIG. 9 is a schematic plan view showing an internal construction of a projector according to a fifth embodiment of the invention.

FIG. 9 shows a configuration example when such a configuration is adopted. Here, a red light emitting diode 122 and a blue light emitting diode 322 which make up a third light source 400 are disposed on a side of a layer holding member 341 which faces a display device 51 together with a heat sink 195 and a collective lens group 430. A dichroic mirror 470 is disposed between the layer holding member 341 and a collective lens 255, and this dichroic mirror 470 is characterized in that the dichroic mirror 470 transmits light in the green wavelength ranges and reflects lights in the red and blue wavelength ranges.

In FIG. 9, too, the light emitting diodes are used as red and blue light sources. Therefore, compared with a case where laser diodes are used, the necessity of diffusing a pencil of light emitted from each of the light emitting diodes is not so high.

In place of the dichroic mirror 470, an optical device having a diffusing layer similar to that of the first embodiment may be used. As this occurs, it is desirable from the viewpoint of diffusing also pencils of red and blue light that the optical device is disposed so that the diffusing layer is oriented towards the light emitting diodes which make up the third light source 400.

In addition, in the first embodiment, the pencil of light from the layer holding member 141 is emitted to the collective lens 255 via the microlens array 254. In the second embodiment, the pencil of light from the layer holding member 341 is emitted to the collective lens 255 via the light tunnel 454. In this way, whether either the microlens array or the light tunnel is adopted or both of them are adopted can be selected as required depending upon the form of the projector 10 irrespective of the form of the layer holding member.

Thus, as has been described heretofore, in the embodiments of the invention, the optical device which is made up of any of the plate-shaped layer holding members 141, 341, 441 is disposed in the light source unit, the layer holding members 141, 341, 441 each having the diffusing layer which is formed on the one side surface and the dichroic layer which is formed on the other side surface thereof. Specifically, in the light source unit, any of the layer holding members 141, 341, 441 is disposed between the first light source 70 having the blue laser diodes each emitting light in the blue wavelength range and the second light source 100 having the luminescent material layer which emits light in the green wavelength range by the use of excitation light from the first light source 70 as the excitation light source. Then, the light source unit configured in this way is provided in the projector 10.

By adopting the layer holding members and disposing them in the way described above, light emitted from the first light source 70 as excitation light which is to be shone on to the luminescent material layer of the luminescent wheel 101 of the second light source 100 can be diffused. Further, the optical device can be obtained which is made up of the layer holding member having the diffusing layer which diffuses light and the dichroic layer which transmits light in a predetermined wavelength range and reflects light in a predetermined wavelength range, this enabling the formation of the light source unit which includes the optical device.

Thus, although highly intense light from the solid light emitting devices of the first light source 70 is used as excitation light, the light actually shone on to the luminescent material layer can be made into diffused light, and therefore, a risk of causing burning in the luminescent material layer can be eliminated, and the luminescent material layer can be protected to promote the long life thereof. Further, lights emitted from the solid light emitting devices of the third light source 400 can also be made into diffused light while protecting the luminescent material layer in that way, and therefore, even in case highly directive light from the solid light emitting device is used as light source, when it is projected on to a screen, image light can form an image which is free from unevenness in luminance and is clear on the screen.

Further, the optical device which can emit lights in the red, green and blue wavelength ranges from the red, green and blue solid light emitting devices in such a way that the axes thereof are aligned in the same direction while keeping the lights diffused can be disposed in one location as the layer holding member. This can provide the light source unit and the projector which can not only enhance the degree of freedom in laying out the involved devices within the projector but also suppress the production costs to a lower level. Additionally, compared with a case where a diffusing plate and a dichroic mirror are provide for each of red, green and blue light sources, the number of parts can be reduced, and this can contribute to making the light source unit and the projector smaller in size.

The layer holding members 141, 341, 441 are formed in such a way that the surface where the diffusing layer is provided and the surface where the dichroic layer is provided are disposed parallel. This facilitates the disposition of the layer holding member in the light source unit, enabling the space where to dispose the layer holding member to be reduced.

The layer holding member 141 is formed into the single plate-shaped member on both side surfaces of which the diffusing layer 141*a* and the dichroic layer 141*b* are formed. In the method for fabricating this layer holding member 141, the sandblasting treatment is applied to one side surface of the layer holding member 141 to form the diffusing layer thereon. Following this, the dichroic coating is applied to the other side surface thereof. This enables the formation of the light source unit by the use of the optical device which contributes further to saving the space where to dispose itself. Since the dichroic coating is applied after the completion of the sandblasting treatment which is applied to form a diffusing layer, the layer holding member 141 can be fabricated while preventing the dichroic coating from being affected badly by the sandblasting treatment.

As in the second embodiment, the layer holding member 341 may have the first layer holding member 341*a* having the diffusing layer and the second layer holding member 341*b* having the dichroic layer and be formed by joining together the first layer holding member 341*a* and the second layer holding member 341*b*. In fabricating the layer holding member, this enables the first layer holding member and the second layer holding member to be formed individually and separately, which allows the individual layer holding members to be treated as common parts among other optical devices, thereby making it possible to realize a reduction in production cost of the light source unit and the like.

Additionally, in the second embodiment, the layer holding member 341 uses the dichroic mirror as the dichroic layer and the diffuse transmission plate as the diffusing layer. This enables the layer holding member to be formed by a dichroic mirror and a diffuse transmission plate which are common parts of other devices, thereby making it possible to provide the light source unit whose production cost is further reduced.

In the light source units, the layer holding members 141, 341, 441 are disposed so that lights from the first light source 70 and the third light source 400 are incident on the surface of thereof where the dichroic layer is provided. This allows not only the lights emitted from the solid light emitting devices of the first light source 70 and the third light source 400 to be diffused but also the luminescent light emitted from the second light source 100 to be diffused.

The second light source 100 is formed by the luminescent wheel device which has the luminescent wheel 101 on which the luminescent material layer is laid out which emits light in the green wavelength range. This makes it possible to obtain the light source unit which can emit light in the green wavelength range as one of the light source colors.

The first light source 70 is formed by the laser diodes which are the solid light emitting devices configured to emit light in the blue wavelength range. This enables the excitation light source to be formed by the solid light emitting device which can emit highly intense light with less electric power. Thus, the laser diodes or the high-output light emitting diodes can be used as the excitation light source, thereby making it possible to obtain more efficient luminescent light.

In addition, in the third embodiment, the first layer holding member 441*a* having the diffusing layer is made to be moved, and this first layer holding member 441*a* is made to be driven to move by the driving device 442. This enables the first layer holding member 441*a* to be given minute vibrations when the pencil of light from the first light source 70 passes through the diffusing layer, whereby the generation of speckle can be reduced in the coherent lights which are emitted from the solid light emitting devices, thereby making it possible to obtain clear projected light.

The dichroic layers of the layer holding members 141, 341, 441 are formed to transmit light in the red wavelength range and light in the blue wavelength range and reflect light in the green wavelength range. Then, the layer holding members 141, 341, 441 are disposed in the position where the axes of light from the green light source device 80 and light from the excitation light source 70 intersect with the axes of light from the red light source device 120 and light from the blue light source device 300. This allows the excitation light source 70 and the luminescent wheel 101 of the green light source device 80 to be able to be disposed to face each other. This enables the red, green and blue light sources to be laid out compact altogether, thereby making it possible to provide the light source unit having the light sources of the three primary colors and the projector including the light source unit.

The embodiments which have been described heretofore are presented as the examples, and hence, the embodiments are not intended to limit the scope of the invention. The novel embodiments can be carried out in other various forms. Thus, various omissions, replacements and alterations can be made without departing from the spirit and scope of the invention. The embodiments and their modifications are included in the spirit and scope of the invention and the scope of inventions described in claims and their equivalents.

What is claimed is:

1. A light source unit comprising:
   a first light source having a solid light emitting device;
   a second light source having a luminescent material layer which emits light in a wavelength range which is different from light in a wavelength range which is emitted from the first light source by using the light emitted from the first light source as an excitation light source; and
   an optical device which is disposed between the first light source and the second light source,
   wherein the optical device includes:
   a dichroic layer which transmits a pencil of light emitted by the first light source and reflects a pencil of light emitted by the second light source; and
   a diffusing layer which diffuses the pencil of light emitted from the first light source.

2. The light source unit according to claim 1, wherein in the optical device, a surface where the diffusing layer is provided and a surface where the dichroic layer is provided are disposed in parallel.

3. The light source device according to claim 1, wherein the optical device is formed of a single plate-shaped member, and the diffusing layer is provided on one side surface and the dichroic layer is provided on the other side surface of the plate-shaped member.

4. The light source device according to claim 2, wherein the optical device is formed of a single plate-shaped member, and the diffusing layer is provided on one side surface and the dichroic layer is provided on the other side surface of the plate-shaped member.

5. The light source unit according to claim 1, wherein the optical device comprises:
   a first layer holding member in which the diffusing layer is provided on one side surface of a first base material which is formed into a plate; and
   a second layer holding member in which the dichroic layer is provided on one side surface of a second base material which is formed into a plate.

6. The light source unit according to claim 2, wherein the optical device comprises:
   a first layer holding member in which the diffusing layer is provided on one side surface of a first base material which is formed into a plate; and
   a second layer holding member in which the dichroic layer is provided on one side surface of a second base material which is formed into a plate.

7. The light source unit according to claim 6, wherein a diffuse transmission plate is the first layer holding member having the diffusing layer, and a dichroic mirror is the second layer holding member having the dichroic layer.

8. The light source unit according to claim 1, wherein in the optical device, the dichroic layer is provided on a side on which light from the first light source is incident.

9. The light source unit according to claim 1, wherein the second light source comprises a luminescent wheel device which has a luminescent wheel on which a luminescent material layer is laid out which emits light in the green wavelength range.

10. The light source unit according to claim 1, wherein the first light source comprises a solid light emitting device which emits light in the blue wavelength range.

11. The light source unit according to claim 1, wherein the diffusing layer is movable, and wherein a driving device is provided which drives the diffusing layer to move.

12. The light source unit according to claim 1, further comprising:
   a third light source which has a solid light emitting device which emits light in a wavelength range which is different from the light in the wavelength range emitted from the solid light emitting device of the first light source and the light in the wavelength range emitted from the second light source,
   wherein the optical device is disposed in a position where an axis of a pencil of light emitted from the first light source intersects with an axis of a pencil of light emitted from the third light source, and
   wherein the dichroic layer transmits the pencil of light emitted by the third light source.

13. The light source unit according to claim 10, wherein the third light source comprises at least one of a solid light emitting device which emits light in the red wavelength range or a solid light emitting device which emits light in the blue wavelength range.

14. A projector comprising:
   a light source unit comprising a first light source having a solid light emitting device, a second light source having a luminescent material layer which emits light in a wavelength range which is different from light in a wavelength range which is emitted from the first light source by using the light emitted from the first light source as an excitation light source, and an optical device which is disposed between the first light source and the second light source, wherein the optical device has a dichroic layer which transmits a pencil of light emitted by the first light source and reflects a pencil of light emitted by the second light source and a diffusing layer which diffuses the pencil of light emitted from the first light source;
   a display device configured to form image light;
   a light source side optical system configured to guide light from the light source unit to the display device;
   a projection side optical system configured to the image light emitted from the display device onto a screen; and
   a projector control unit configured to control the display device and the light source unit.

* * * * *